US006915291B2

(12) United States Patent
Carlson et al.

(10) Patent No.: US 6,915,291 B2
(45) Date of Patent: Jul. 5, 2005

(54) OBJECT-ORIENTED QUERY EXECUTION DATA STRUCTURE

(75) Inventors: David Glenn Carlson, Rochester, MN (US); David Lee Hermsmeier, Oronoco, MN (US); Kevin James Kathmann, Rochester, MN (US); Thomas Owen McKinley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/165,293

(22) Filed: Jun. 7, 2002

(65) Prior Publication Data

US 2003/0229627 A1 Dec. 11, 2003

(51) Int. Cl.[7] .......................... G06F 17/30; G06F 17/00
(52) U.S. Cl. .................. 707/2; 707/3; 707/4; 707/102; 715/514
(58) Field of Search .................. 707/1–4, 101–103; 715/514

(56) References Cited

U.S. PATENT DOCUMENTS

| | | | |
|---|---|---|---|
| 5,412,804 A | * | 5/1995 | Krishna .......................... 707/2 |
| 6,064,804 A | | 5/2000 | Brink et al. |
| 6,064,816 A | * | 5/2000 | Parthasarathy et al. ..... 717/109 |
| 6,263,328 B1 | | 7/2001 | Coden et al. |
| 6,289,334 B1 | | 9/2001 | Reiner et al. |
| 6,314,430 B1 | | 11/2001 | Chang |
| 2002/0035559 A1 | | 3/2002 | Crowe et al. |
| 2003/0187858 A1 | | 10/2003 | Kirk et al. |
| 2003/0208489 A1 | | 11/2003 | Todd |

OTHER PUBLICATIONS

G. Mitchell, "Extensible Query Processing in an Object-Oriented Database," May 1993, Thesis, Department of Computer Science, Brown University, pp. 1–166.

IBM Patent Application filed on even date herewith by Carlson et al., "Runtime Query Optimization for Dynamically Selecting from Multiple Plans in a Query Based Upon Runtime–Evaluated Performance Criterion" (ROC920010235US1).

IBM Patent Application filed on even date herewith by Carlson et al., "Parallel Database Query Processing for Non–Uniform Data Sources via Buffered Access" (ROC920010234US1).

IBM Patent Application filed on even date herewith by Carlson et al., "Method for Efficient Processing of Multi-State Attributes" (ROC920010305US1).

* cited by examiner

*Primary Examiner*—Alford W. Kindred
(74) *Attorney, Agent, or Firm*—Wood, Herron & Evans (57) ABSTRACT

An apparatus, program product and method represent a database query access plan a query execution data structure including a plurality of query node objects arranged into a tree relationship to define a parent node object and at least one child node object, and an attribute data structure that references a plurality of attributes utilized by the query execution data structure. At least one of the parent and child node objects includes an attribute operation data structure configured to manipulate at least a subset of the plurality of attributes in the attribute data structure by accessing the attribute operation data structure. By partitioning the functionality of a query access plan into a collection of node objects and an attribute data structure, and then providing within at least a subset of the node objects attribute operation data structures that manipulate the attribute data structure, the resulting query engine architecture becomes significantly extendible and adaptable. Moreover, through appropriate selection of attribute operations, and coding of such operations using directly executable program code, optimal query engine performance may also be obtained.

24 Claims, 6 Drawing Sheets

```
                    INNER JOIN NODE
NODE DATA MEMBERS:
    XLEFTCHILD      //POINTER TO LEFT CHILD NODE
    XRIGHTCHILD     //POINTER TO RIGHT CHILD NODE
    XFETCHLEFT      //FLAG INITIALLY SET TO "TRUE"

NODE LOGIC:
 FOR (;;) {
    IF (XFETCHLEFT) {
        STATUS=XLEFTCHILD.EXECUTE()
        IF(STATUS==TRUE) {
            XRIGHTCHILD.POSITIONBEFORESTART()  //RESET RIGHT CHILD
            STATUS=XRIGHTCHILD.EXECUTE()
            IF(STATUS==TRUE) {
                XFETCHLEFT=FALSE
                BREAK                          //RETURN TO CALLER, HIT ON RIGHT SUBTREE
            }
            ELSE
                CONTINUE;                      //LOOP AGAIN
        }
        ELSE BREAK;
    }
    ELSE {
        STATUS=XRIGHTCHILD.EXECUTE()
        IF(STATUS==TRUE)
            BREAK;                             //RETURN TO CALLER, HIT ON RIGHT SUBTREE
        ELSE
            XFETCHLEFT=TRUE;                   //RIGHT SUBTREE EXHAUSTED, RETURN TO LEFT
    }
```

OBJECT-ORIENTED QUERY EXECUTION DATA STRUCTURE

CROSS-REFERENCE TO RELATED APPLICATIONS

This application is related to U.S. Ser. No. 10/165,235, filed on even date herewith by David Glenn Carlson et al. and entitled "PARALLEL DATABASE QUERY PROCESSING FOR NON-UNIFORM DATA SOURCES VIA BUFFERED ACCESS" (hereinafter "Carlson I") U.S. Ser. No. 10/165,025, filed on even date herewith by David Glenn Carlson et al. and entitled "RUNTIME QUERY OPTIMIZATION FOR DYNAMICALLY SELECTING FROM MULTIPLE PLANS IN A QUERY BASED UPON RUNTIME-EVALUATED PERFORMANCE CRITERION" (hereinafter "Carlson II"), and to U.S. Ser. No. 10/164,767, filed on even date herewith by David Glenn Carlson et al. and entitled "METHOD FOR EFFICIENT PROCESSING OF MULTI-STATE ATTRIBUTES" (hereinafter "Carlson III"). The disclosures of each of these applications are incorporated by reference herein.

FIELD OF THE INVENTION

The invention relates to database management systems, and in particular, to the execution of database queries.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. As the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query. In addition, a reduced reliance on runtime interpretation of queries in favor of increased usage of directly-executable program code has improved query engine performance.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area where substantial performance gains may be achieved is query execution, e.g., the actual generation of result sets for optimized or unoptimized representations of queries. In this regard, the manner in which queries are represented and presented to an execution engine for processing, and the manner in which an execution engine processes those queries, can vary substantially, and can have a substantial effect on overall database performance.

In database management systems that incorporate query optimization, a query optimizer typically generates an access plan for a query that specifies one or more instructions to a query engine to enable the query engine to execute a particular query. In some database designs, query access plans are represented using interpretive code, which may require substantial processing overhead to interpret and execute access plan instructions. In other instances, query access plans may be assembled from blocks of executable code, with an interpreter used to select those blocks to be executed. In still other instances, query access plans may be represented using directly executable code, which provides comparatively lower processing overhead.

Despite the various manners in which the code used to represent a query access plan may be executed, in many instances, these query access plan representations are all relatively fixed in format, and as a consequence are difficult to adapt and otherwise extend to incorporate new functionality. Modifying and/or improving a query engine design is therefore problematic in many of these instances.

In still other database designs, in particular in some object-oriented database designs, query access plans may be represented as collections of objects serving as nodes in a tree data structure. Often, the representations of query access plans as collections of objects facilitates extension of a query engine architecture due to the ability to modify and extend various objects used to form a query access plan. However, in many instances, the individual objects retain a substantial amount of fixed program code, which limits the degree of extensibility, and thus hampers the ability of database designers to modify or improve a database engine design.

Given that continual refinements in a query engine design may be necessary to keep pace with the continual advances of others, it is highly desirable to provide an efficient, high performance query engine architecture that is also readily extensible and adaptable.

SUMMARY OF THE INVENTION

The invention addresses these and other problems associated with the prior art by providing an apparatus, program product and method in which a database query access plan is represented using a query execution data structure including a plurality of query node objects arranged into a tree relationship to define a parent node object and at least one child node object, and an attribute data structure that references a plurality of attributes utilized by the query execution data structure. At least one of the parent and child node objects includes an attribute operation data structure configured to manipulate at least a subset of the plurality of attributes in the attribute data structure by accessing the attribute operation data structure.

By partitioning the functionality of a query access plan into a collection of node objects and an attribute data structure, and then providing within at least a subset of the node objects attribute operation data structures that manipulate the attribute data structure, the resulting query engine architecture becomes significantly extendible and adaptable. Moreover, in some embodiments consistent with the invention, through appropriate selection of attribute operations, and coding of such operations using directly executable program code, optimal query engine performance may also be obtained.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed hereinafter utilize a unique query execution data structure to represent an access plan for a query to be executed by a database management system. However, prior to a discussion of a specific implementation of such a data structure, a brief discussion will be provided regarding an exemplary hardware and software environment within which such a data structure may be utilized. As will become more apparent below, however, it will be appreciated that the herein-described functionality may be utilized in environments other than that described below. Therefore, the invention is not limited to the particular environments described herein.

Hardware/Software Environment

Figure 1:
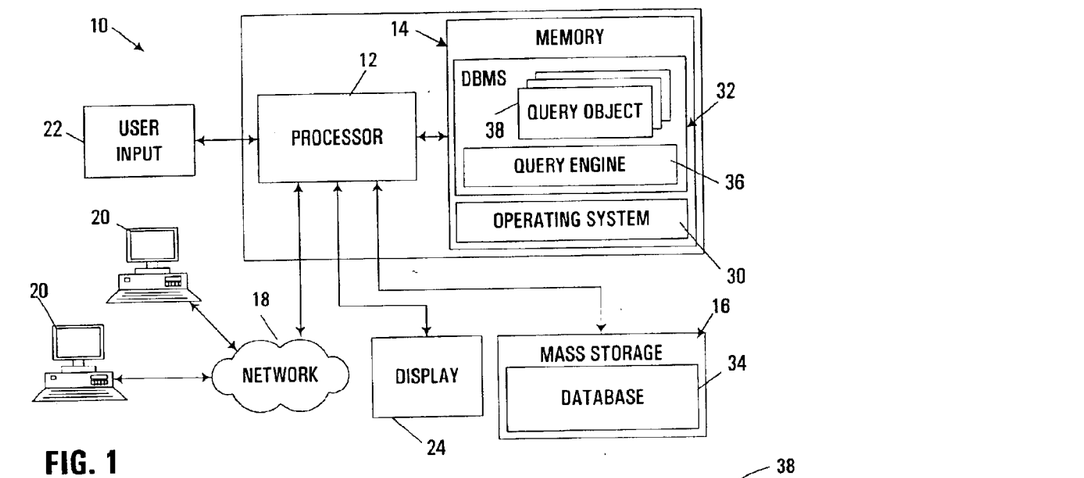
FIG. 1 is a block diagram of a computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system incorporating an object-oriented query execution data structure consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Object-Oriented Query Model

As discussed above, various embodiments of the invention may be implemented within a database management system (DBMS) incorporating an object-oriented query model. As shown in FIG. 1, for example, a database management system 32 may be used to access a database 34, representing a data space, with database management system 32 including a query engine 36 configured to execute database queries that are implemented using one or more query objects 38.

Figure 2:
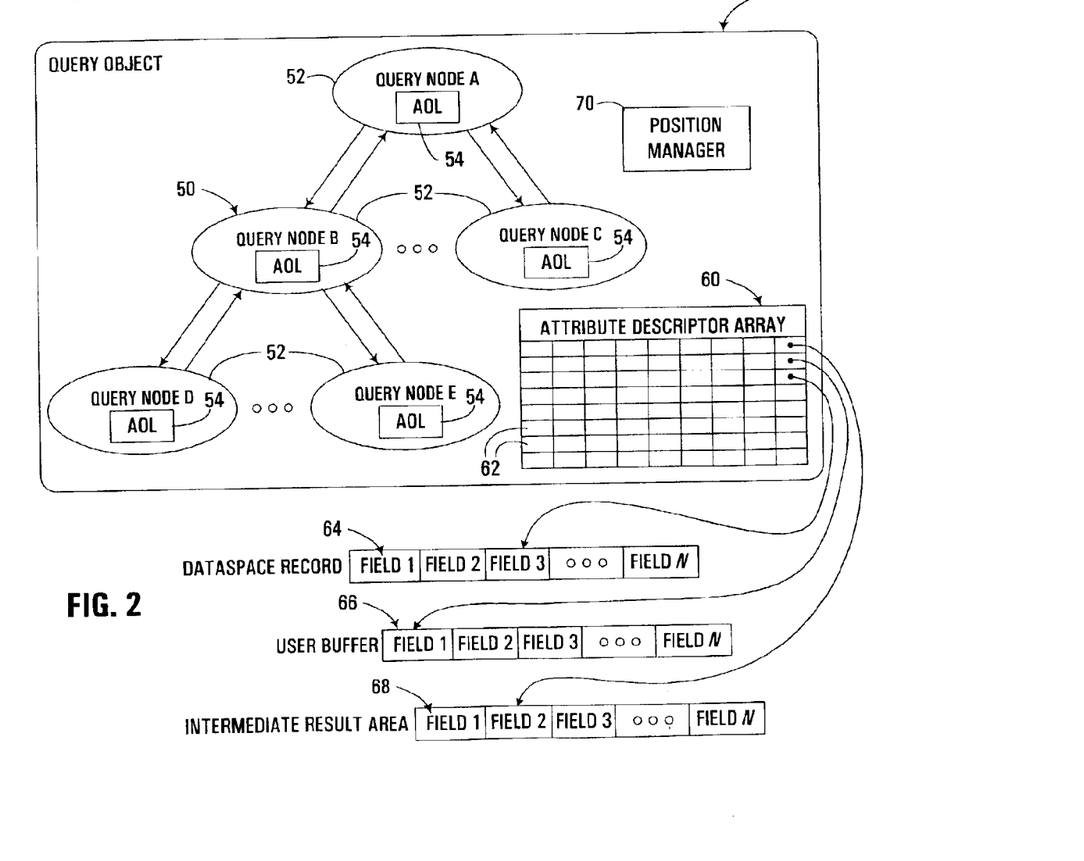
FIG. 2 is a block diagram illustrating the principal architecture of an exemplary query object from the computer system of FIG. 1.

FIG. 2 illustrates an exemplary implementation of a query object 38, capable of being executed by query engine 36 of FIG. 1. A query object generally includes a query execution tree 50 packaged with an attribute descriptor array 60. Moreover, the query object typically includes a number of methods capable of performing specific operations relevant to management of the query object and the execution of a query represented by such an object, as will be described further hereinafter.

In addition, a query object 38 may also include a position manager 70 that incorporates locking information for ensuring data integrity and preventing race conditions, which is particularly useful in connection with parallel execution of queries. Position manager 70 also performs various additional functions such as transaction processing and commitment control. Alternate functionality may be implemented with a query object consistent with the invention.

Query execution tree 50 supports the definition of an entire query in a tree structure, where a plurality of query nodes 52 are organized such that operations are performed in a generally bottom-up manner, whereby each parent node operates on the result data returned from its respective child node(s). In addition, sibling nodes that share a common parent will typically be executed in a nested manner from left to right, so that execution of one node that is to the right of another node is nested within the execution of the other node. In other environments, however, other orders of execution of the various nodes in a tree may be used.

Each query node 52 typically incorporates the logic (algorithms) required to perform specific tasks in connection with a query. To define these tasks, each query node typically includes one or more attribute operation lists (AOL's) 54, that define certain operations to be performed by that node. However, in some embodiments, attribute operation lists may not be disposed within each query node, particularly where a particular node operates in a predefined manner on the result data returned by its child nodes, and without regard for the specific results returned by those nodes. In such instances, the operations of such nodes may be hard-coded for greater performance and efficiency.

Attribute descriptor array 60 defines the fields that are operated upon by a query. The array defines a vector of attribute descriptors 62 that describe a particular field utilized in a query. Each attribute descriptor 62 also contains a reference to the actual field.

As will become more apparent below, each attribute descriptor can reference practically any data accessible to a database engine. For example, an attribute descriptor can reference a field 64 in a data space record, i.e., a table entry in the database. In the alternative, an attribute descriptor can reference a field 66 in a user buffer, i.e., the result buffer into which results are ultimately deposited. Moreover, an attribute descriptor may reference a field 68 in an intermediate result area, which functions as a working space or temporary storage utilized during execution of a query, and which may be used to store support information such as constants and temporary variables.

Figure 3:
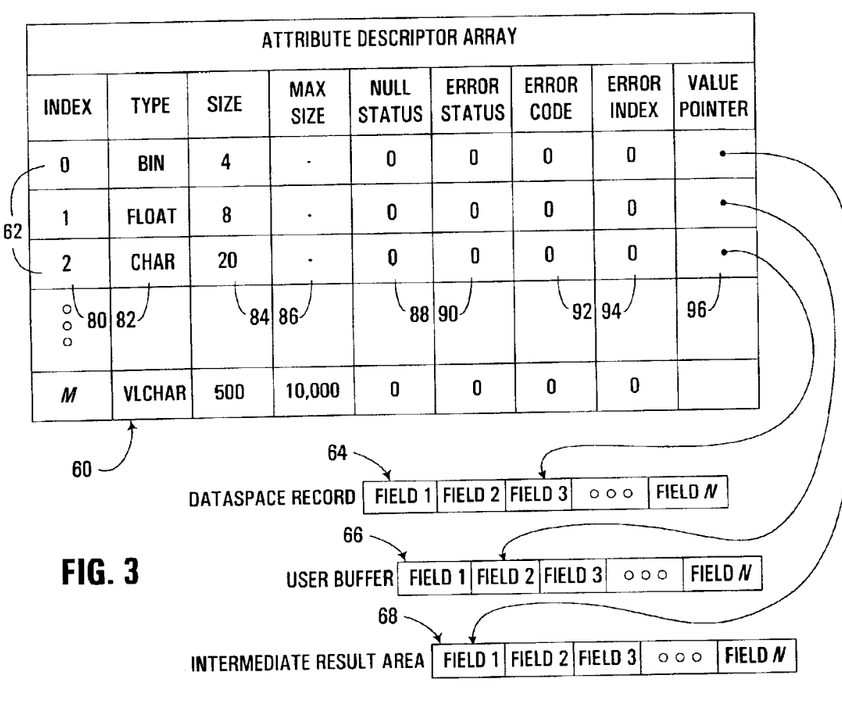
FIG. 3 is a block diagram of an exemplary attribute descriptor array from the query object of FIG. 2.

FIG. 3, for example, illustrates an exemplary attribute descriptor array 60 including a plurality of entries 62 defining attribute descriptors for various types of attributes. Each entry 62 includes a plurality of fields 80–96, which describe a particular type of attribute. Field 80 stores an index into the attribute descriptor array, and is used to locate a particular attribute in the array. Field 82 stores a data type, representing the type of data contained by the field. Fields 84 and 86 respectively store the size and maximum size (if appropriate) of a particular field. Fields 88, 90, 92 and 94 respectively store a null status flag, an error status flag, an error code and an error index that points to the source of an error.

Field 96 stores a reference to a particular field in the data space, user buffer or intermediate result area to be operated upon during execution of the query. As will become more apparent below, the reference stored in field 96 for a particular described attribute may be updated during execution of the query to point to appropriate fields in records being operated upon by the query. As a result, during the execution of a query, the references associated with each attribute descriptor are typically updated continuously as new records are processed by the query.

It should be appreciated that different status and attribute description information may be stored in each entry 62 or array 60. Moreover, other data structures may be used to represent the attributes to be acted upon by a query. Therefore, the invention is not limited to the particular collection of descriptor information illustrated in FIG. 3.

Figure 4:
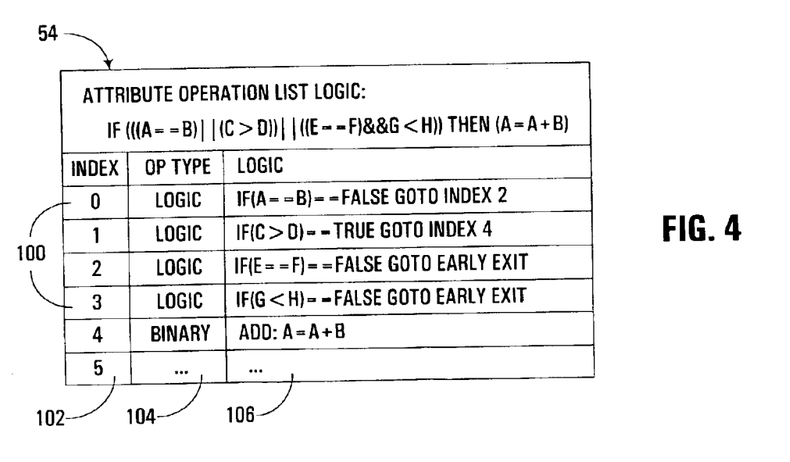
FIG. 4 is a block diagram of an exemplary attribute operation list from the query object of FIG. 2.

FIG. 4 illustrates an exemplary attribute operation list 54. An attribute operation list defines one or more attribute operations that manipulate and/or compare attribute descriptors in an attribute descriptor array. An attribute operation list typically contains all of the data manipulation and comparison logic required to do one iteration of work. Typically, such attribute operation lists are iteratively executed to process a set of records in the context of executing a query.

Typically, an attribute operation list, when executed, is passed a parameter that identifies the current database record upon which to perform the predetermined operation. Functionality defined within methods capable of being called in the attribute operation list is used to update the attribute descriptor array entries to point to the appropriate fields in the current database record, the intermediate result area and/or the user buffer, such that the references in the attribute descriptor array can be utilized in executing the attribute operation list.

As shown in FIG. 4, an attribute operation list 54 therefore includes a plurality of attribute operation entries 100, each including a field 102 storing an index or pointer to that operation, a field 104 storing the type of operation, and a field 106 storing the precise logic to execute for that operation. While in the discussion herein, the attribute operation data structure is described as a list or array, it should be appreciated that such a data structure may be implemented in a number of alternate manners, e.g., via a tree or graph of linked attribute operation objects, as described in the aforementioned Carlson III application.

The operation type field 104 may store various types of operation categories, including, for example, logic types, binary types, set attribute descriptor types, ternary types, etc. In addition, an innumerable number of logic operations may be defined in each field 106. Moreover, this logic may be represented in any number of manners, including script, executable code, interpreted code, etc.

In the exemplary attribute operation list illustrated in FIG. 4, for example, the operation used to implement the logic "IF (((A=B) OR (C>D)) OR ((E=F) AND (G<H)) THEN A=A+B)" is illustrated in the entries 100 having indices of 0–4. In this example, the parameters A, B, C, D, E, F, G and H each represent pointers to attribute descriptor entries in the attribute descriptor array, with these attribute descriptors initially set to point to appropriate fields in the data space, user buffer and/or intermediate result area to perform the given attribute operation logic upon a number of fields.

Given the wide variety of tasks that may be performed in the operation of a query, it will be appreciated that an innumerable number of statement types, commands, program flow commands, etc., may be stored within an attribute operation list consistent with the invention. Moreover, various manners of implementing the logic in an attribute operation list may be used. For example, in the illustrated implementation, live execution of virtual objects may be used. Further detail on one desirable implementation of attribute operation lists is provided, for example, in the aforementioned Carlson III application.

In other embodiments, the attribute operation list logic may be implemented in other manners, e.g., via interpretive code. Given the innumerable number of manners that attribute operation list logic could be implemented, the invention is not limited to the particular implementations discussed herein.

Figure 5A:
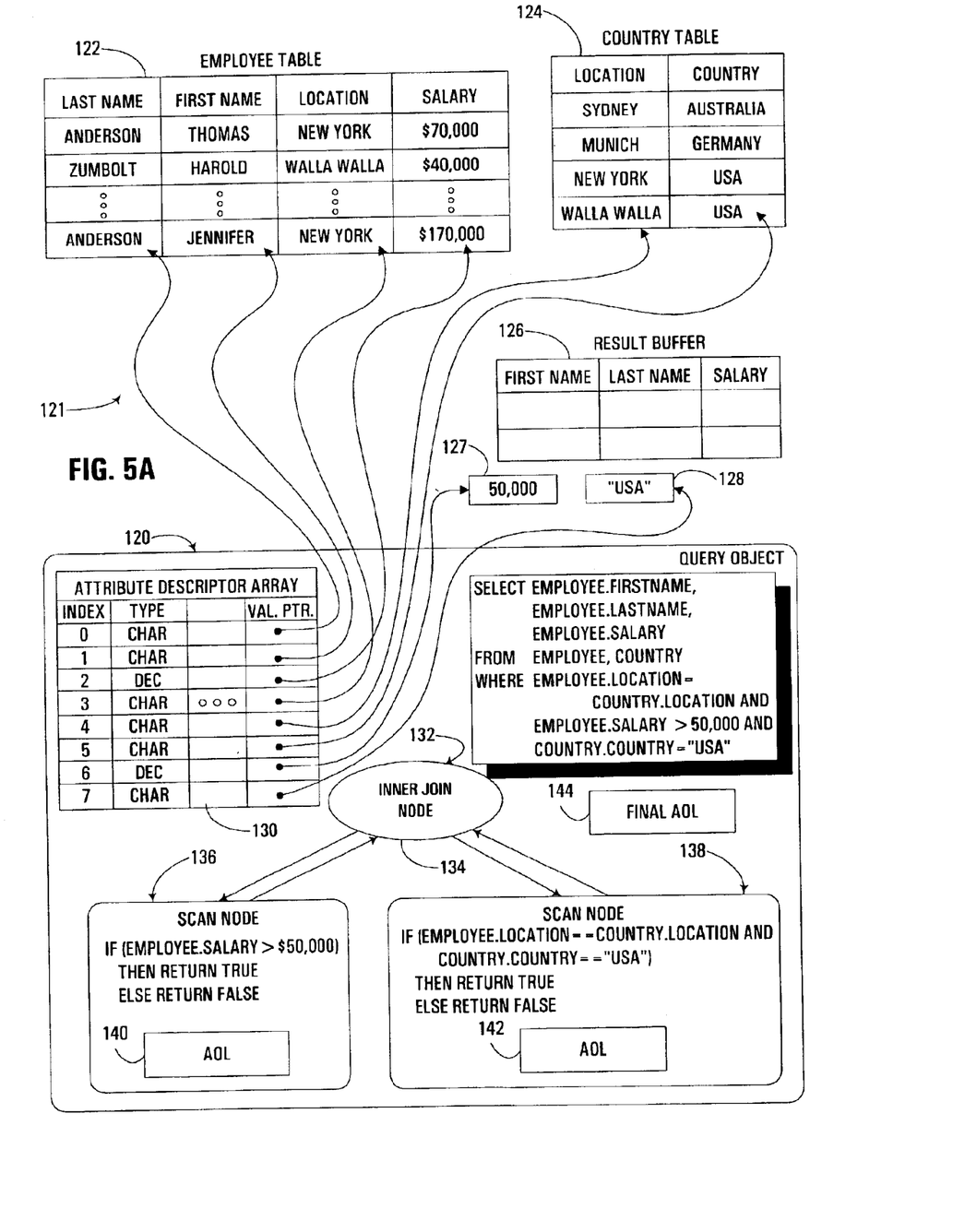
FIGS. 5A–5D illustrate an exemplary implementation of a query in an exemplary database in the computer system of FIG. 1.

Turning next to FIGS. 5A–5D, an exemplary implementation of a query using the herein-described database management system is shown. In particular, FIG. 5A, illustrates an exemplary query object 120 suitable for performing a query on an exemplary database 121.

Assume, for the purposes of this example, that database 121 includes, in part, an Employee table 122 and a Country table 124. The Employee table 122 includes fields for Last Name, First Name, Location, and Salary for each employee, while the Country table 124 includes fields for Location and Country.

Assume also that a user wishes to find all employees who make over $50,000 per year, and who live in the United States, and to display the first and last names and salaries of those matching employees.

Query object 120 as illustrated may be used to perform the user's desired query, and return the results in a result buffer 126. To this extent, query object 120 includes an attribute descriptor array 130 and a query execution tree 132. It should be noted that the attribute descriptor array is global with respect to the nodes within tree 132, and thus is capable of being used for communication between the various nodes in the tree.

Array 130 includes attribute descriptor entries at indices 0, 1, 2 and 3 that respectively point to the Last Name, First Name, Salary and Location fields in a current row in table 122, and attribute descriptor entries at indices 4 and 5 that respectively point to the Location and Country fields in a current row in Country table 124. The attribute descriptor entries at indices 6 and 7 point to a pair of constants 127 and 128 (e.g., stored in an intermediate result buffer) required to implement the query.

Tree 132 includes three nodes, an inner join node 134 and a pair of scan nodes 136, 138, each including a corresponding attribute operation list 140, 142. Together, these nodes implement the SQL statement:

SELECT Employee.FirstName, Employee.LastName, Employee.Salary
FROM Employee, Country
WHERE Employee.Location=Country.Location AND
Employee.Salary>50,000 AND
Country.Country="USA"

Scan nodes 136 and 138 respectively implement scans of the Employee and Country tables 122 and 124. Scan node 136 attempts to locate a next record in Employee table 122 where the Salary field is greater than $50,000, while scan node 138 attempts to determine whether the Location field of a matching record returned by scan node 136 has a corresponding record in the Country table with a Country field matching "USA".

Figure 5B:
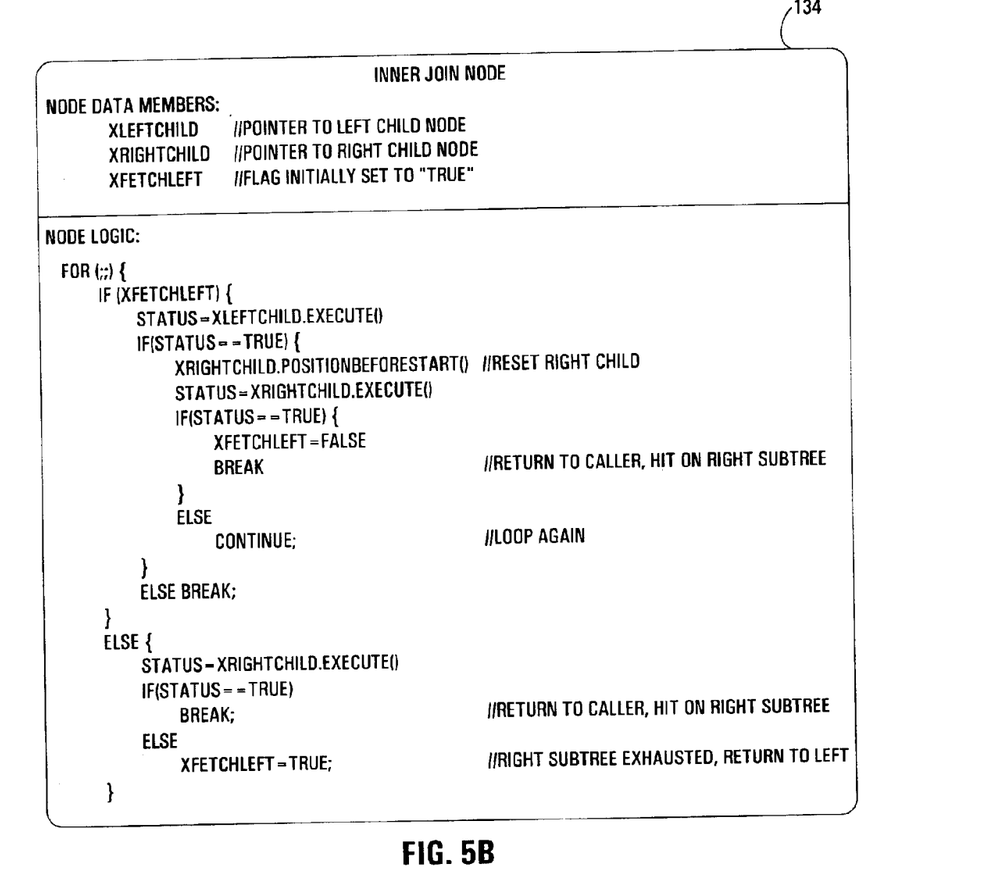

FIG. 5B illustrates in greater detail the basic logic implemented in inner join node 134. The logic in node 134 (which is illustrated in the figure in pseudocode form) may be hard coded, or in the alternative, may incorporate an attribute operation list if desired.

As shown in FIG. 5B, the inner join node has data members including pointers to the left and right child nodes (here scan nodes 136 and 138), as well as an additional flag used by the node logic represented thereafter in the figure. The logic principally operates by calling PositionNext( ) and Execute( ) methods on the left and right child nodes in a nested manner, and using a PositionBeforeStart( ) method on scan node 138 to reset a record pointer to the Country table 124 upon each successful location of a record matching the criterion for Employee table 122 upon execution of scan node 136.

Returning briefly to FIG. 5A, to populate a result buffer using the records selected by query execution tree 132, query object 120 may incorporate program code, e.g., in the form of a "final" attribute operation list 144, which typically may be executed for each record selected by query execution tree 132 to populate the result buffer with the desired fields for the selected record (e.g., for the example query above, the FirstName, LastName and Salary fields). An AOL 144 may incorporate, for example, a sequence of mapping operations to map fields from a selected record to appropriate locations in the result buffer.

Figure 5C:
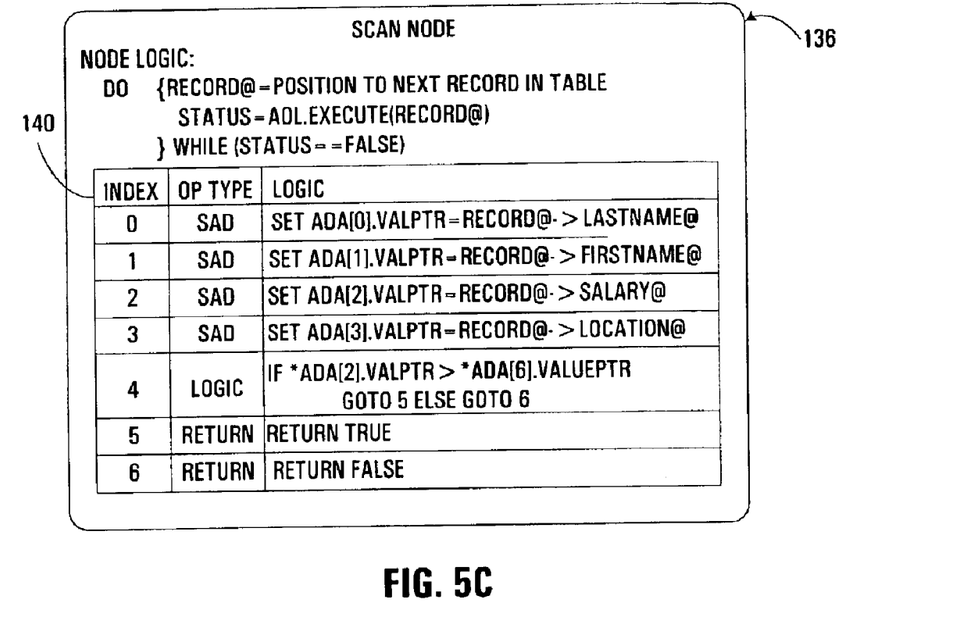
Figure 5D:
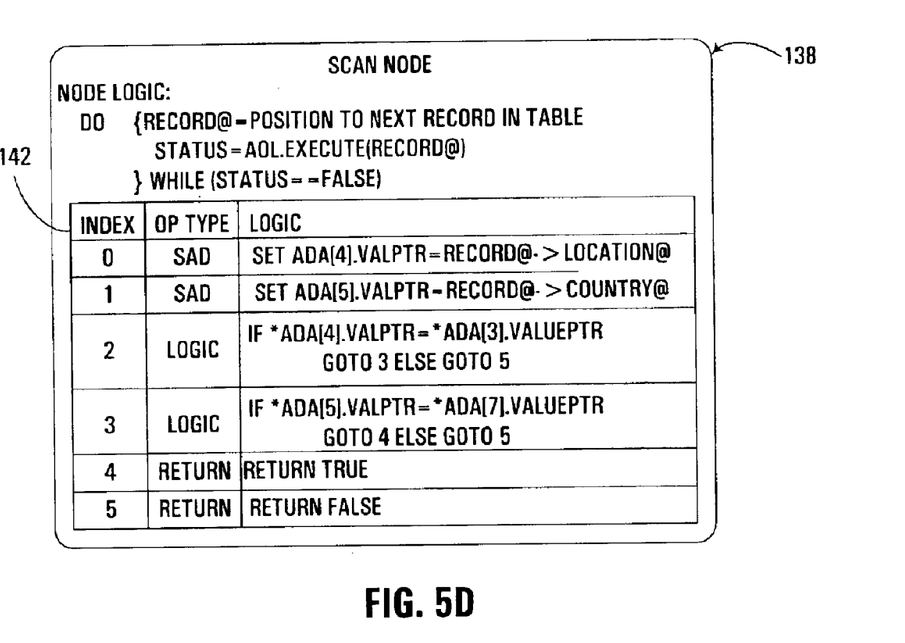

As shown in FIGS. 5C and 5D, scan nodes 136 and 138 incorporate essentially the same hard coded logic to repeatedly invoke an Execute( ) method on the respective attribute operation list 140, 142 to locate a next record matching the defined criterion. Thus, the functionality of these nodes is distinguished principally by the configuration of the respective attribute operation lists 140, 142. As a consequence, it may be appreciated that a generic dataspace scan node object may be adapted to implement a particular dataspace scan operation on a table with relatively little effort, simply through the construction of an attribute operation list performing the appropriate actions for the dataspace scan operation. Doing so allows for a reasonable set of total nodes to be defined and supported by a query engine, but still allows for very tailored and efficient nodes performing very specific tasks.

As shown in FIG. 5C, attribute operation list 140, at indices 0–3, performs Set Attribute Descriptor (SAD) operations to set the value pointer (VALPTR) fields of the attribute descriptors at indices 0–3 of array 120 (ADA[0]–ADA[3]) to point to the Last Name, First Name, Salary and Location fields of a current row or record in Employee table 122. Index 4 of list 140 is a Logic statement that tests whether the Salary field of the current record (now pointed to by ADA[2]) is greater than the constant stored in ADA[6] (here, constant 127), and that passes control to the statements at either of indices 5 and 6 based upon the result. Indices 5 and 6 are Return statements that return either a "true" or "false" status to the node logic.

As shown in FIG. 5D, attribute operation list 142, at indices 0–1, performs Set Attribute Descriptor (SAD) operations to set the value pointer (VALPTR) fields of the attribute descriptors at indices 4–5 of array 120 (ADA[4]–ADA[5]) to point to the Location and Country fields of a current row or record in Country table 124. Index 2 of list 142 is a Logic statement that tests whether the Location field of the current record in the Country table (now pointed to by ADA[4]) matches the Location field of the current record in the Employee table (now pointed to by ADA[3]). Index 3 of list 142 is a Logic statement that tests whether the Country field of the current record in the Country table (now pointed to by ADA[5]) matches the constant stored in ADA[7] (here, constant 128). If both conditions are met, control will pass to index 4 to return a "true" result, otherwise, a "false" result will be returned as a result of control passing the index 5.

It will be appreciated that FIGS. 5A–5D illustrate a relatively simple example of a query implementation using the aforementioned query object model. However, it will equally be appreciated that implementation of more complex queries occurs in much the same manner as described in connection with the aforementioned figures.

It will be appreciated by one of ordinary skill in the art having the benefit of the instant disclosure that the aforementioned query object model provides a highly extensible, flexible and powerful model for creating database queries, and having many of the benefits afforded by object-oriented concepts. Through the provision of appropriate libraries of attribute descriptor arrays, attribute operation lists, query nodes, query execution trees and/or query objects, new database queries can be rapidly assembled from pre-existing structures, and pre-existing structures can be modified or extended as necessary to support new functionality and data structures, without affecting the functionality of other structures.

In the illustrated embodiment, it may be desirable to incorporate a number of different types of query nodes into a library for use in constructing query objects. The various types of nodes may include, for example, unary nodes (nodes that have single child nodes, and that control the flow of execution to those child nodes), binary nodes (nodes that have two child nodes, and that control the flow of execution to those child nodes), leaf nodes (nodes without any children nodes, and typically constructed to access a given native or query data source), and join-type nodes (binary nodes that perform join operations using the results of two child nodes). It should also be appreciated that, in many instances, the children of a particular node may themselves incorporate one or more children, such that, for example, a unary node may have a single child node that is, itself, the root of a subtree comprising multiple nodes.

In addition, typically only leaf nodes need be bound to a given data source at construct time. Other node types may be configured to access data items from data sources by referencing appropriate attribute descriptors in an attribute descriptor array, and using attribute operations as defined in a node's attribute operation list(s).

In the illustrated embodiment, nodes of all such types may be based upon a base node class that define's a standard set of return statuses (e.g., False, Error, Null, True, Interrupt Pending, Exceptions, Lock Failure, etc.), a set of statistical outputs (e.g., cycle counts, instruction counts), a node number or identifier that uniquely identifies each node within a tree of nodes, as well as various virtual methods that may be accessed by other nodes (e.g., to provide functions such as position before start, position after end, validate, refresh, position before, position after, position next and execute, position previous and execute, resume, cleanup, etc.

As an example of the various types of unary nodes that may be desirable to incorporate into a library, collections of any or all of the following nodes may be supported in the illustrated embodiment:

Aggregate Node—Used to perform an aggregation of data provided from a child node or subtree. Assumes a child node provides the data in a group-by order. An aggregate node may have three different attribute operation lists (AOL's), one to initialize the current group, one to perform per group entry processing, and a final one to perform end of group processing.

Logic Node—Incorporates an attribute operation list that is run when its child node returns true.

Dsp Probe Node—Used to randomly access a table. May contain a reference to a Relative Record Number (RRN). Typically would have an index access node as its child node that sets the RRN. A Dsp Probe Node may call its child node first and then execute its own AOL.

Sort Node—Used to sort data provided by its child node.

IO Node–Used to perform I/O operations against a data source. Typically would have the data source as its child node. May have derived classes to be used in conjunction with specific data sources (i.e., dataspace, hash tables, bitmaps, etc.), and/or how those datasources will be accessed. Subtypes may include a Dsp IO Sequential node that can be used in conjunction with a Dsp Scan Node, a Dsp IO Random node that can be used with a Dsp Probe Node, and a Din Random IO Node that buffers dataspace key values and rows. Providing I/O in separate nodes may provide greater flexibility to perform I/O, although in other embodiments, I/O operations may be incorporated into the same nodes.

Cache Node—Used to keep a cache of values around for reuse to avoid rerunning a child node and its underlying nodes. Each entry may have a key and the data for all attributes normally contributed by the underlying nodes. It may be desirable to include multiple types of cache nodes, e.g., one that eliminates duplicate values, another that contains all occurrences of a matching key.

As an example of the various types of binary nodes that may be desirable to incorporate into a library, collections of any or all of the following nodes may be supported in the illustrated embodiment:

And Node—Only returns TRUE if both child nodes return TRUE.

Or Node—Returns TRUE if either of its child nodes delivers TRUE.

UnionAll Node—Appends complete answer sets from child nodes. Typically keeps calling left child node until end of file and then calls right child node until it gives end of file. The result set contains all tuples from both subtrees.

Union Node—Combines two sorted result sets (subtrees) A and B. The result set contains all tuples from A and B, with duplicate tuples removed.

IntersectAll Node—Combines two sorted result sets (subtrees) A and B. The result set contains all tuples that are in both A and B.

Intersect Node—Combines two sorted result sets (subtrees) A and B. The result set contains all tuples that are in both A and B, with duplicate tuples removed.

Except Node—Combines two sorted result sets (subtrees) A and B. The result set contains all distinct tuples in A that are not in B.

As an example of the various types of leaf nodes that may be desirable to incorporate into a library, collections of any or all of the following nodes may be supported in the illustrated embodiment:

Dsp Scan Node—Used to implement a table scan.

Ptb Scan Node—Used to sequentially scan data from a Packed Tuple Buffer (PTB), i.e., a buffer of data.

Din Scan Node—Used to sequentially scan a dataspace index.

Pth Scan Node—Used to sequentially scan a Packed tuple hash (PTH) object (a hash table).

Pth Probe Node—Used to randomly access a packed tuple Hash object using a set of attributes as a key.

Rrn Bitmap Qds Scan Node—Used to scan an RRN bitmap and return valid RRN's allowing a parent node to access a table row.

Din List Probe Node—Used to access a dataspace index using a list of key ranges.

Din Probe Node—Used to search for a particular key value. These objects may have an Initial AOL that builds the search key value, along with an AOL that unbuilds the result key and does key selection.

Logic Leaf Node—Used to house an AOL, e.g., for an SQL statement that does not access any table.

Rrn List Qds Scan Node—Used to scan through an RRN list and return valid RRN's allowing a parent node to access a table row.

As an example of the various types of join-type nodes that may be desirable to incorporate into a library, collections of any or all of the following nodes may be supported in the illustrated embodiment:

Subquery Node—Used for a subquery case where the node returns a TRUE result if there is one hit from the right hand child node. On subsequent calls to the node, it will always go to the left hand child. Functions like a Distinct Inner Join.

Exception Join Node—Calls left child and if that returns TRUE, it calls right child. If right child returns TRUE, the left child is called again. If the right child returned FALSE, an AOL is called that will line up on the default record.

Inner Join Node—Calls left child, and if TRUE, calls right child. FALSE from left child causes this node to return FALSE. A FALSE from right child causes this node to recall its left child.

Left Outer Join Node—Calls right child after TRUE from left child and runs an AOL to position to the default row if the right child returns FALSE. If the right child returns TRUE, no AOL is run, and this node returns TRUE.

In addition, it may also be desirable to incorporate additional functionality, e.g., to support parallelism during query execution through the use of query buffers, as described in the aforementioned Carlson I application, or to support runtime query optimization, as described in the aforementioned Carlson II application.

As an example of the extensibility of the herein-described query model, consider the aforementioned exemplary query object illustrated in FIGS. 5A–5D. As discussed above, the query object implements a database query that returns the first and last names and salaries of all employees in a database who make over $50,000 per year, and who live in the United States. In doing so, the exemplary query object utilizes scan nodes to query employee and country tables in the database.

Suppose for the purposes of the example that a query optimizer determines through cost analysis that the most efficient way to implement the query would be to perform an index probe of the country table in lieu of scanning the table as is performed by the query object of FIGS. 5A–5D. To do so, an alternate query object may be constructed using many of the same components as are illustrated in FIGS. 5A–5D, but with an "index probe node" used in place of scan probe 138.

Figure 6A:
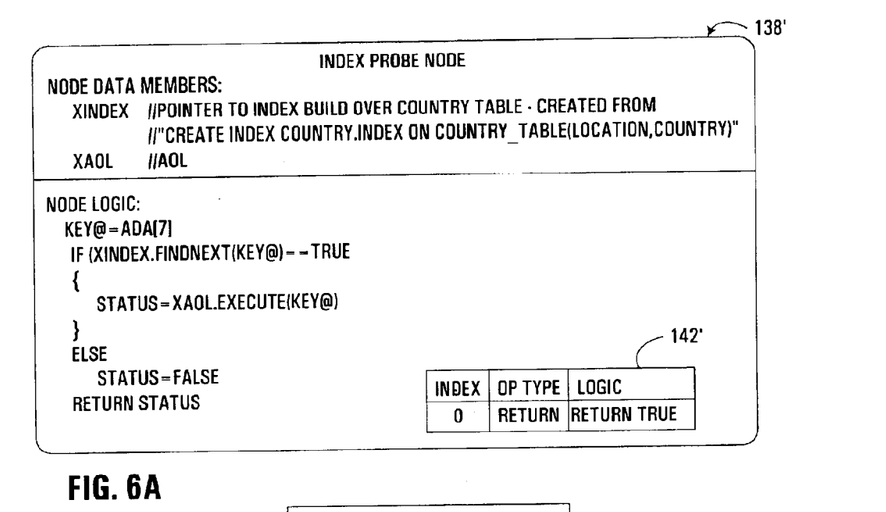
FIGS. 6A–6C illustrate an alternate index probe implementation to that of FIGS. 5A–5D.

FIG. 6A, for example, illustrates an exemplary index probe node 138' that may be used in an alternate query object to that of FIGS. 5A–5D, to implement essentially the same database query. In this alternate node 138', an essentially empty AOL 142' is used, with the selection functionality implemented within the index probe node itself. In other embodiments, an AOL may be used to implement the desired functionality, e.g., when selection is needed on non-leading key fields.

To implement an index probe, node 138' includes an xIndex pointer to an index that has been built over the country table, created via an SQL statement such as "CRE- ATE INDEX Country_Index ON Country_Table (Location, Country)", and having a key format of (Location, Country). Node 138' also includes an xAOL pointer to the empty AOL 142' in the node.

The node logic for node 138' simply executes a "find next" method on the index, which returns a TRUE result upon locating another matching key in the Country table, or FALSE once no more matching keys are located.

Figure 6B:
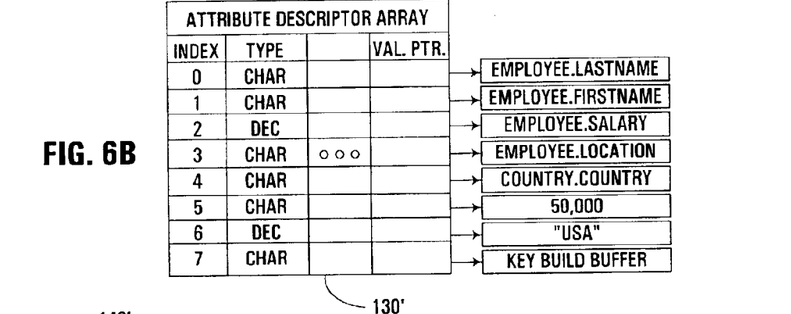
Figure 6C:
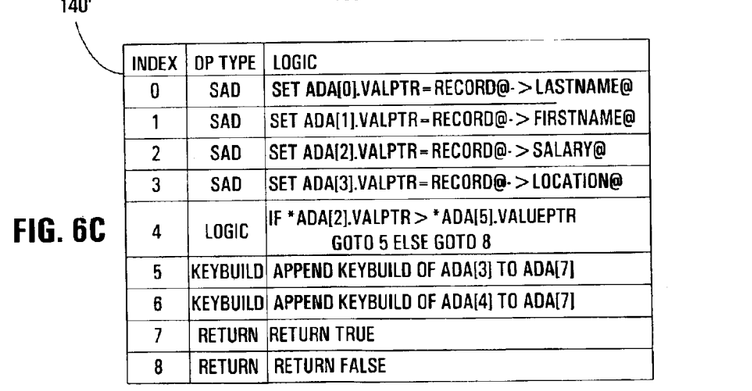

To support the inclusion of node 138' in a query object, it may be necessary to modify other components in the object. For example, FIG. 6B illustrates an alternate attribute descriptor array 130' to that of FIG. 5A, which differs to the extent that no entry for Country.Location is required in array 130', and that an additional entry referencing a key build buffer is used (ADA[7]). In addition, as shown in FIG. 6C, an AOL 140' may be incorporated into scan node 136 of FIG. 5C, as an alternative to AOL 140. AOL 140' differs to the extent that, upon finding a matching record in the Employee table, a key build of the Location and Country fields of the Country table is performed at indices 5 and 6 of AOL 140'.

It will be appreciated that the creation of the aforementioned structures and their incorporation into a database management system, as well as the creation of a database engine and development environment suitable for both executing queries and developing new queries, would be well within the capabilities of one of ordinary skill in the art having the benefit of the instant disclosure. Moreover, it will be appreciated that any of the modifications and variations discussed in the aforementioned Carlson I, II, and III applications may also be incorporated into the various embodiments discussed herein.

Various additional modifications may also be made to the illustrated embodiments without departing from the spirit and scope of the invention. Therefore, the invention lies in the claims hereinafter appended.

What is claimed is:

1. A method of executing a query, comprising:
    (a) accessing, from a query execution data structure representative of a database query access plan for the query, at least one of a parent node object and a child node object from among a plurality of query node objects arranged into a tree relationship; and
    (b) manipulating at least a subset of a plurality of attributes referenced in an attribute data structure defined in the query execution data structure by processing at least one operation defined in an attribute operation data structure defined in the accessed node object, wherein processing the operation includes obtaining a reference for at least one attribute in the subset of attributes from the attribute data structure;
   wherein at least one of the plurality of node objects in selected from a library of node objects, and wherein the plurality of node objects includes a node object selected from the group consisting of a unary node object, a binary node object, a leaf node object and a join-type node object.

2. The method of claim 1, wherein the attribute data structure is global to the plurality of node objects.

3. The method of claim 2, wherein at least one of the child nodes is configured to communicate with the parent node by modifying an attribute referenced in the attribute data structure.

4. The method of claim 1, wherein at least one of the child nodes is configured to return a status to the parent node upon execution of such child node by the parent node.

5. The method of claim 1, wherein the attribute data structure comprises an attribute descriptor array including a plurality of entries, each entry indexed by a unique index, and including a pointer to an attribute from among the plurality of attributes, and wherein a node from among the plurality of nodes is configured to access an attribute from among the plurality of attributes by accessing the attribute descriptor array entry including a pointer to such attribute.

6. The method of claim 5, wherein the plurality of attributes include at least one attribute selected from the group consisting of a dataspace attribute, an intermediate result attribute, and a result buffer attribute.

7. The method of claim 1, wherein the attribute operation data structure comprises an attribute operation list.

8. The method of claim 7, wherein the attribute operation list includes a plurality of entries, each entry associated with an operation to be performed during execution of the attribute operation list.

9. The method of claim 7, wherein the accessed node object includes additional logic configured to execute the attribute operation list.

10. A method of building an access plan for a query, comprising:
    (a) generating a query execution data structure;
    (b) populating the query execution data structure with an attribute data structure that references a plurality of attributes to be used during execution of a query;
    (c) populating the query execution data structure with a plurality of node objects arranged into a tree relationship, the plurality of node objects including at least one parent node object and a child node object, and
    (d) populating at least one of the parent and child node objects with an attribute operation data structure configured to manipulate at least a subset of the plurality of attributes by accessing the attribute operation data structure;
   wherein at least one of the plurality of node objects is selected from a library of node objects, and wherein the plurality of node objects includes a node object selected from the group consisting of a unary node object, a binary node object, a leaf node object and a join-type node object.

11. The method of claim 10, wherein populating the query execution data structure with a plurality of node objects includes selecting at least one node object from a library of node objects.

12. An apparatus, comprising:
    (a) a memory within which is resident a query execution data structure representative of a database query access plan, the query execution data structure including a plurality of query node objects arranged into a tree relationship to define a parent node object and at least one child node object, and an attribute data structure that references a plurality of attributes utilized by the query execution data structure, wherein at least one of the parent and child node objects includes an attribute operation data structure configured to manipulate at least a subset of the plurality of attributes by accessing the attribute operation data structure; and
    (b) program code configured to access the query execution data structure resident in the memory;
   wherein at least one of the plurality of node objects is selected from a library of node objects, and wherein the plurality of node objects includes a node object selected from the group consisting of a unary node object, a binary node object, a leaf node object and a join-type node object.

13. The apparatus of claim 12, wherein the program code is configured to access the query execution data structure by manipulating at least a subset of the plurality of attributes referenced in an attribute data structure defined in the query execution data structure by processing at least one operation defined in the attribute operation data structure.

14. The apparatus of claim 12, wherein the attribute data structure is global to the plurality of node objects.

15. The apparatus of claim 14, wherein at least one of the child nodes is configured to communicate with the parent node by modifying an attribute referenced in the attribute data structure.

16. The apparatus of claim 12, wherein at least one of the child nodes is configured to return a status to the parent node upon execution of such child node by the parent node.

17. The apparatus of claim 12, wherein the attribute data structure comprises an attribute descriptor array including a plurality of entries, each entry indexed by a unique index, and including a pointer to an attribute from among the plurality of attributes, and wherein a node from among the plurality of nodes is configured to access an attribute from among the plurality of attributes by accessing the attribute descriptor array entry including a pointer to such attribute.

18. The apparatus of claim 17, wherein the plurality of attributes include at least one attribute selected from the group consisting of a dataspace attribute, an intermediate result attribute, and a result buffer attribute.

19. The apparatus of claim 12, wherein the attribute operation data structure comprises an attribute operation list.

20. The apparatus of claim 19, wherein the attribute operation list includes a plurality of entries, each entry associated with an operation to be performed during execution of the attribute operation list.

21. The apparatus of claim 19, wherein the accessed node object includes additional logic configured to execute the attribute operation list.

22. The apparatus of claim 12, wherein the program code is further configured to generate the query execution data structure by populating the query execution data structure with the attribute data structure and the plurality of node objects.

23. A program product, comprising:

(a) a query execution data structure representative of a database query access plan, the query execution data structure including a plurality of query node objects arranged into a tree relationship to define a parent node object and at least one child node object, and an attribute data structure that references a plurality of attributes utilized by the query execution data structure, wherein at least one of the parent and child node objects includes an attribute operation data structure configured so manipulate at least a subset of the plurality of attributes by accessing the attribute operation data structure; and (b) a signal bearing medium bearing the query execution data structure;

wherein at least one of the plurality of node objects is selected from a library of node objects, and wherein the plurality of node objects includes a node object selected from the group consisting of a unary node object, a binary node object, a leaf node object and a join-type node object.

24. The program product of claim 23, wherein the sign bearing medium includes at least one of a transmission medium and a recordable medium.

* * * * *

UNITED STATES PATENT AND TRADEMARK OFFICE
CERTIFICATE OF CORRECTION

PATENT NO. : 6,915,291 B2
DATED : July 5, 2005
INVENTOR(S) : David Glenn Carlson et al.

It is certified that error appears in the above-identified patent and that said Letters Patent is hereby corrected as shown below:

Column 13,
Line 51, "in" should be -- is --.

Column 16,
Line 18, "so" should be -- to --.
Line 29, "sign" should be -- signal --.

Signed and Sealed this

Fourth Day of October , 2005

JON W. DUDAS
*Director of the United States Patent and Trademark Office*